UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

946,540.     Specification of Letters Patent.     Patented Jan. 18, 1910.

No Drawing.     Application filed March 23, 1908. Serial No. 422,674.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Storage Batteries, of which the following is a description.

In Letters Patent of the United States No. 873,220, dated December 10, 1907, I describe certain improvements in storage batteries, using alkaline electrolytes with an oxygen compound of nickel as the active depolarizing material, and in which an oxygen compound of bismuth is added to the nickel mass, so as to result in a substantial increase in the capacity. I suggest in said patent the admixture of the two oxygen compounds by precipitating them from their dissolved salts.

My present invention relates to an improved process by means of which the oxygen compound of bismuth can be more effectively added to the nickel mass and the addition can be under better control than by the specific practice suggested in my said patent. Also, my present method can be practiced for the addition of the oxygen compound of bismuth after the individual electrode elements have been formed, and indeed, after they have been assembled in the usual plates or grids. Ordinarily, however, I prefer to carry on the process in connection with the active material before the latter is introduced within the containing pockets, since it is possible in this way to perform the process more economically and on a large commercial scale.

In carrying the invention into effect, and assuming that the process is to be utilized commercially in connection with the manufacture of the depolarizing material before the latter is introduced within the receiving pockets, I proceed substantially as follows:—
Nickel hydroxid obtained in any suitable way, is first crushed into small granules, so that the whole mass will pass a 20-mesh screen. To a sufficient quantity of this material, I now add a concentrated solution of a bismuth salt, dissolved in a suitable solvent. One example of such a solution is tri-chlorid of bismuth dissolved in a strong aqueous solution of chlorid of ammonia, and another example is tri-chlorid of bismuth dissolved to saturation in acetone. By varying the proportion of bismuth salt used, the amount of bismuth added to the active material may be readily and accurately controlled. Enough of the solution is added to cover the nickel hydroxid mass, which is allowed to soak for several hours in the solution until the pores of the hydroxid particles become saturated therewith. The solution is now drawn off, and the wet mass of active material is preferably subjected to the action of a centrifuge, by which most of the adhering solution will be removed, and a rapid partial drying thereby effected. The mass is now dried either naturally or by the application of heat, and when thoroughly dry, is added to a considerable excess of a 10% solution of potassic or sodium hydrate, which is then heated for several hours near the boiling point, and for about thirty minutes at the boiling point. As a result of this action, the bismuth salt will be converted to the oxid or hydroxid thereof. Afterward, the caustic solution is drawn off, and the resulting mass is successively washed with warm water until the alkali is washed out, after which the mass is dried and is ready to be used in connection with the make-up of the electrodes in any suitable way.

Storage batteries employing nickel hydroxid, the particles of which contain in their pores bismuth oxid or hydroxid, as explained, will not deteriorate in capacity to the same extent over long periods of time, as when nickel hydroxid alone is used. By employing in the electrolyte, a small percentage of lithium hydroxid, as I describe in Letters Patent dated January 14, 1908 and numbered 876,445, the capacity of the battery is very greatly increased, especially when used in badly ventilated places, in which the temperature of the cells is unduly raised. I am still unable to explain the reason for the superior results which are secured when bismuth oxid or hydroxid is employed in connection with the active nickel mass and when lithium hydroxid is used in the electrolyte, but the fact remains that, as a result of actual test and observation, the advantages pointed out are secured.
While I prefer to treat the nickel hydroxid in mass, as explained, so that the bismuth will be absorbed in its pores before the active material is introduced into the electrode elements, it will be understood that the tubes or pockets or other supports for the nickel hydroxid may be first filled with the same, and if desired, the tubes or pockets may be actually mounted in the supporting plates, which may be then soaked in the bismuth solution, after which the electrode elements so treated may be dried, heated in a caustic alkali solution, as explained, and finally washed free of the alkali.

In some respects, the addition of bismuth, as explained, may be advantageously effected in connection with the active iron mass on the negative electrode, this being especially true when mercury is used therewith, since a bismuth amalgam will be formed, which possesses some advantages over mercury alone in constituting a continuous net work of conductors extending in all directions through the mass. In an application filed concurrently herewith, I describe my improved process as carried out for this purpose. In the present case, I propose to claim the improved nickel mass resulting from the treatment described, and to claim the process broadly as applied to the treatment of the active mass of an alkaline storage battery, including in that expression, the active material on either electrode. In my concurrent application, I propose to claim the specific process of adding bismuth to the active material by subjecting one or more electrode plates containing the active material to the process described, and to claim the improved iron mass containing bismuth.

Having now described my invention, what I claim as new and desire to secure by Letters Patent as follows:—

1. The process of impregnating a mass of active material for alkaline storage batteries with an oxygen compound of bismuth, which consists in soaking the active mass in a solution of a bismuth salt, and in heating the mass as so treated in a caustic alkali solution, substantially as set forth.

2. The process of impregnating a mass of active material for alkaline storage batteries with an oxygen compound of bismuth, which consists in soaking the active mass in a solution of bismuth salt, in drying the mass, and in then heating it in a caustic alkali solution, substantially as and for the purposes set forth.

3. The process of impregnating a mass of active material for alkaline storage batteries, with an oxygen compound of bismuth, which consists in soaking the active mass in a solution of bismuth salt, in drying the mass, in then heating it in a caustic alkali solution, and in finally washing the mass so treated, substantially as set forth.

4. The process of impregnating a mass of active material for alkaline storage batteries, with an oxygen compound of bismuth, which consists in soaking the active mass in a solution of bismuth salt, in centrifuging the mass, in then heating it in a caustic alkali solution, and in finally washing the mass to remove the alkali, substantially as set forth.

5. The process of impregnating a mass of active material for alkaline storage batteries with an oxygen compound of bismuth, which consists in soaking the active mass in a solution of a bismuth salt, in centrifuging the mass, in then drying it, in then heating the dried mass in a caustic alkali solution, and in finally washing the mass to remove the alkali, substantially as set forth.

6. The process of impregnating a mass of active material for alkaline storage batteries with an oxygen compound of bismuth, which consists in soaking the active mass in a solution of tri-chlorid of bismuth, and in heating the mass in a caustic alkali solution, substantially as set forth.

7. The process of impregnating a mass of active material for alkaline storage batteries with an oxygen compound of bismuth, which consists in soaking the active mass in a solution of tri-chlorid of bismuth in acetone, and in heating the mass in a caustic alkali solution, substantially as set forth.

This specification signed and witnessed this 13th day of March 1908.

THOS. A. EDISON.

Witnesses:
ANNA R. KLEHM,
H. H. DYKE.